United States Patent [19]

Fujisawa et al.

[11] Patent Number: 5,588,657
[45] Date of Patent: Dec. 31, 1996

[54] LAMINATED METAL GASKET WITH DIVERSE BEAD HEIGHT

[75] Inventors: Katsuhide Fujisawa; Eiichi Tahara; Tetsuya Hida, all of Yamato, Japan

[73] Assignee: Nippon Reinz Co., Ltd., Kanagawa, Japan

[21] Appl. No.: 538,399

[22] Filed: Oct. 3, 1995

[51] Int. Cl.$^6$ ........................................ F16J 15/08
[52] U.S. Cl. ........................................ 277/180; 277/235 B
[58] Field of Search ........................ 277/180, 235 B, 277/235 A, 233

[56] References Cited

U.S. PATENT DOCUMENTS

| 4,799,695 | 1/1989 | Yoshino . |
| 4,836,562 | 6/1989 | Yoshino . |
| 5,149,110 | 9/1992 | Inamura . |
| 5,286,039 | 2/1994 | Kawaguchi et al. ............ 277/235 B |
| 5,348,315 | 9/1994 | Kawaguchi et al. ............ 277/235 B |
| 5,370,406 | 12/1994 | Ueta et al. .................... 277/235 B |

FOREIGN PATENT DOCUMENTS

| 39868 | 2/1993 | Japan .................. 277/235 B |

Primary Examiner—Scott Cummings
Attorney, Agent, or Firm—Koda and Androlia

[57] ABSTRACT

A laminated metal gasket used as a cylinder head gasket for an internal combustion engine, disposed between a pair of joint surfaces having at least one hole to be sealed comprising at least one intermediate plate made of a metal plate, and a pair of surface plates made of elastic metal plates, such as steel plates or stainless steel plates, laminated on both sides of the intermediate plate, the intermediate plate and the surface plates each having at least one hole portion corresponding to the hole to be sealed, the intermediate plate being equipped with a folded portion which is made by folding back the inner peripheral edge portion around the hole portion to the joint surface subjected to more significant distortion and deformation during operation among the pair of joint surfaces, and the surface plates each being equipped with a bead surrounding the hole portion outside the folded portion, the bead of the surface plate coming into contact with the joint surface to be subjected to more significant distortion and deformation is made higher than that of the surface plate coming into contact with the other joint surface.

13 Claims, 4 Drawing Sheets

LAMINATED METAL GASKET WITH DIVERSE BEAD HEIGHT

BACKGROUND OF THE INVENTION

1. Field of the Invention

The present invention relates to a laminated metal gasket used as a cylinder head gasket or the like and interposed between the cylinder head and the cylinder block of an internal combustion engine to seal the surfaces between them.

2. Prior Art

Conventionally, a laminated metal gasket having a sealing structure shown in FIG. 9 around hole portions 100 to be sealed, such as combustion chamber holes, water holes or oil holes provided in a cylinder head gasket is well known. The laminated metal gasket has a structure wherein on both sides of an intermediate plate 103 made of metal and having a folded portion 104 at a peripheral edge portion of the hole portion 100 to be sealed, surface plates 101, 102 are laminated which are made of elastic metal plates and have beads 105, 106 surrounding, outside the folded portion 104, the above-mentioned hole portion 100.

The beads 105 and 106 of the above-mentioned surface plates 101,102 are formed in the same shape having the same dimensions in height and width. The vertexes of the beads 105 and 106 face each other and come into contact with the intermediate plate 103. On the surfaces of the surface plates 101, 102, a thin layer 107 made of sealing material, such as rubber or plastic,is coated to compensate for the roughness, distortion, scratches, etc. on the joint surfaces between which the gasket is sandwiched.

In the above-mentioned sealing structure, the hole portion 100 is double-sealed by the thick gasket portion formed by the folded portion 104 at the peripheral edge portion of the hole portion 100 to be sealed and the beads 105, 106 surrounding the hole portion 100 outside the thick gasket portion, thereby ensuring proper sealing performance.

However, when such joint surfaces as those of the cylinder head and the cylinder block of an engine, for example, are distorted and deformed significantly because of bolt tightening or exposure to high temperature and combustion gas pressure and when the amounts of the distortion and deformation on one joint surface differ considerably from those on the other joint surface, leakage is apt to occur on the joint surface which has been distorted and deformed more significantly in the case of the above-mentioned sealing structure. More particularly, when the cylinder head is made of an aluminum alloy and the cylinder block is made of cast iron, the amounts of the distortion and deformation on one joint surface differ considerably from those of the other surface because of differences in thermal expansion and rigidity. Even in the case when both the cylinder head and the cylinder block are made of an aluminum alloy, the amounts of the distortion and deformation on one joint surface differ from those of the other surface because of difference in rigidity caused by difference in the structures of the two components. Larger distortion and deformation are usually caused on the joint surface of the cylinder head.

In the above-mentioned conventional sealing structure, it is difficult for the inner sealing portion thereof, that is, the thick gasket portion at the peripheral edge portion of the hole portion 100 to be sealed, to follow such significant distortion and deformation. The outer sealing portions, that is, the beads 105, 106 surrounding the hole portion 100 follow the distortion and deformation on the joint surfaces by elastic deformation to seal the hole portion 100. However, when the distortion and deformation on the joint surfaces are significant and when the amounts of the distortion and deformation on one joint surface differ considerably from those on the other joint surface, the amount of restoration of the bead of the surface plate coming into contact with the joint surface which-has been distorted more significantly becomes insufficient. As a result, necessary sealing pressure cannot be obtained, and leakage is caused.

SUMMARY OF THE INVENTION

The present invention is intended to solve the above-mentioned problems encountered in the conventional sealing structure. An object of the present invention is to increase the amount of elastic restoration of the bead of the surface plate coming into contact with the joint surface which is distorted and deformed more significantly during operation among the two joint surfaces with a basket disposed therebetween, thereby preventing leakage from the joint surface which has been distorted and deformed more significantly. Another object of the present invention is to decrease the expansion/shrinkage deformation of the bead which is heightened to increase the amount of restoration thereof, thereby preventing creep relaxation and the occurrence of cracks/fractures at the bead during the use of the gasket for an extended period of time. Still another object of the present invention is to provide a laminated metal gasket production method, by which the gasket of the present invention capable of attaining the above-mentioned objects can be produced advantageously.

The gasket of the present invention capable of attaining the above-mentioned objects is defined as a laminated metal gasket disposed between a pair of joint surfaces having at least one hole to be sealed. The gasket comprises at least one intermediate plate made of a metal plate and a pair of surface plates made of elastic metal plates laminated on both sides of the intermediate plate, the intermediate plate and the surface plates each having at least one hole portion corresponding to the above-mentioned hole to be sealed, the intermediate plate being equipped, adjacent to the hole portion, with an annular folded portion which is made by folding back the inner peripheral edge portion thereof to the surface plate coming into contact with the joint surface to be subjected to more significant distortion and deformation during operation among the above-mentioned pair of joint surfaces, and the surface plates each being equipped with a bead surrounding the hole portion outside the folded portion, wherein the bead of the surface plate coming into contact with the above-mentioned joint surface to be subjected to more significant distortion and deformation is made higher than that of the surface plate coming into contact with the other joint surface.

As a typical example of the above-mentioned pair of joint surfaces, the joint surfaces of the cylinder head and the cylinder block of an automobile internal combustion engine can be taken. In this case, the joint surface of the cylinder head is not always but usually subjected to more significant distortion and deformation during operation. A combustion chamber hole is taken as a typical example of the hole to be sealed on the joint surface. A water hole or an oil hole may also be taken as the example.

In the present invention, since the bead for surrounding and sealing a hole portion, such as a combustion chamber hole or a water hole, provided in the surface plate coming into contact with the joint surface subjected to more significant distortion and deformation during operation is formed sufficiently higher than the bead for surrounding the hole portion provided in the surface plate coming into contact with the other joint surface and the amount of elastic restoration of such a higher bead is larger, such a higher bead can adequately follow the large distortion and deformation of the joint surface, thereby ensuring necessary sealing pressure and preventing leakage.

Although the higher bead has a larger amount of elastic restoration, creep relaxation and cracks/fractures are apt to be caused at the higher bead when elastic expansion and shrinkage are repeated for an extended period of time owing to the fluctuation of the inner pressure at the hole to be sealed, such as the fluctuation of the gas pressure in the combustion chamber. However, in the present invention, the intermediate plate has the folded portion at the peripheral edge portion of the hole on the side of the surface plate coming into contact with the joint surface to be subjected to more significant distortion and deformation, and the folded portion reduces the elastic expansion/shrinkage of the higher bead. As a result, creep relaxation and the occurrence of cracks/fractures at the higher bead can be prevented, thereby enhancing the reliability of the gasket.

In the present invention, a flat thickness regulating plate which is thinner than the intermediate plate may be laminated on the surface of the intermediate plate on the same side of the folded portion thereof without overlapping the folded portion. In addition, a second intermediate plate which is flat and does not have any folded portion or bead may be laminated on the surface of the intermediate plate opposite to the side on which the folded portion is formed. More preferably, such a second intermediate plate is thicker than the intermediate plate having the folded portion.

In the gasket including the above-mentioned second intermediate plate laminated therein, after the heights of the beads surrounding the hole portions in the pair of surface plates are first made identical to each other and after the surface plates, the intermediate plate and the second intermediate plate are laminated one another as designated, the thus laminated gasket is precompressed between flat-plate-shaped molds. By conducting these processes, the bead of the surface plate which comes into contact with the folded portion of the intermediate plate can be made higher than that of the bead of the other surface plate. With this method, the laminated metal gasket of the present invention can be produced advantageously.

DETAILED DESCRIPTION OF THE PREFERRED EMBODIMENTS

Figure 1:
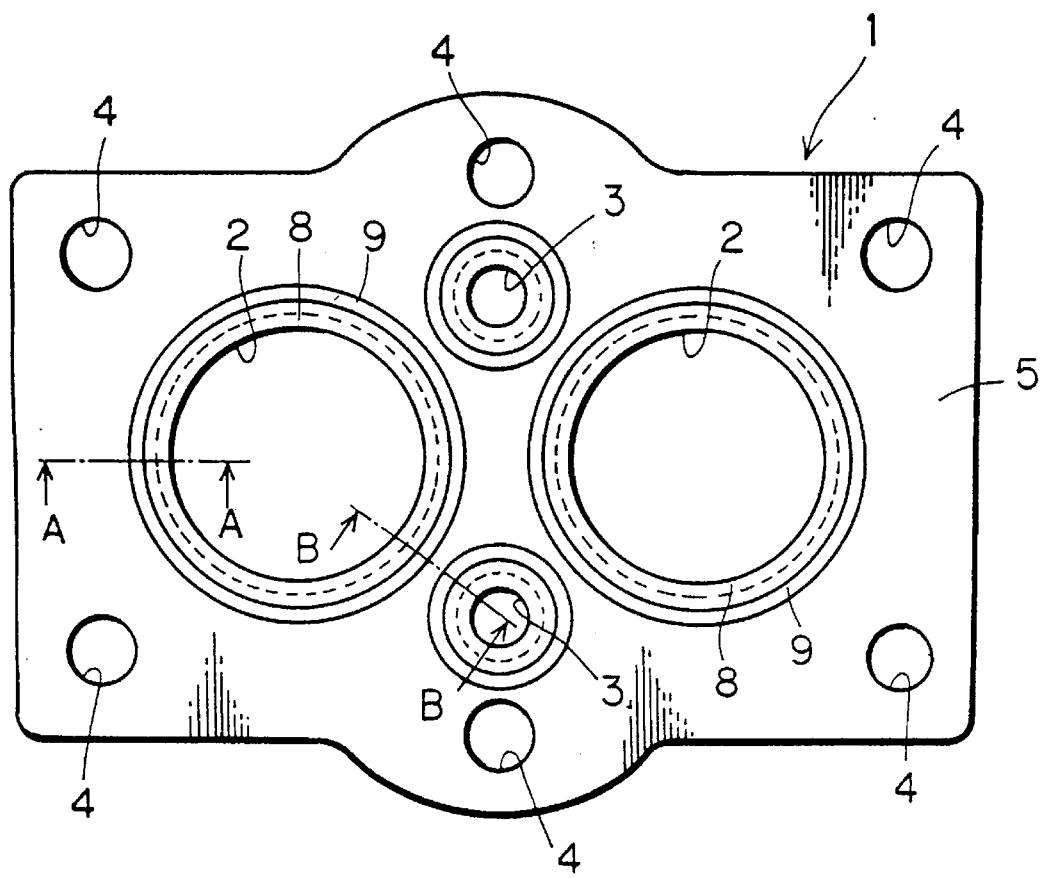
FIG. 1 is a plan view showing a first embodiment of a cylinder head gasket made of a laminated metal gasket of the present invention, in which thin layers made of sealing material (corresponding to reference numeral 11 in FIG. 2) are not shown for easier understanding of the figure.
Figure 2:
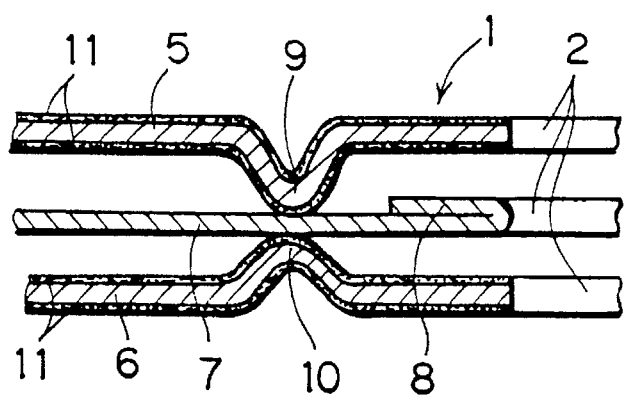
FIG. 2 is a sectional view taken on line A—A of FIG. 1.
Figure 3:
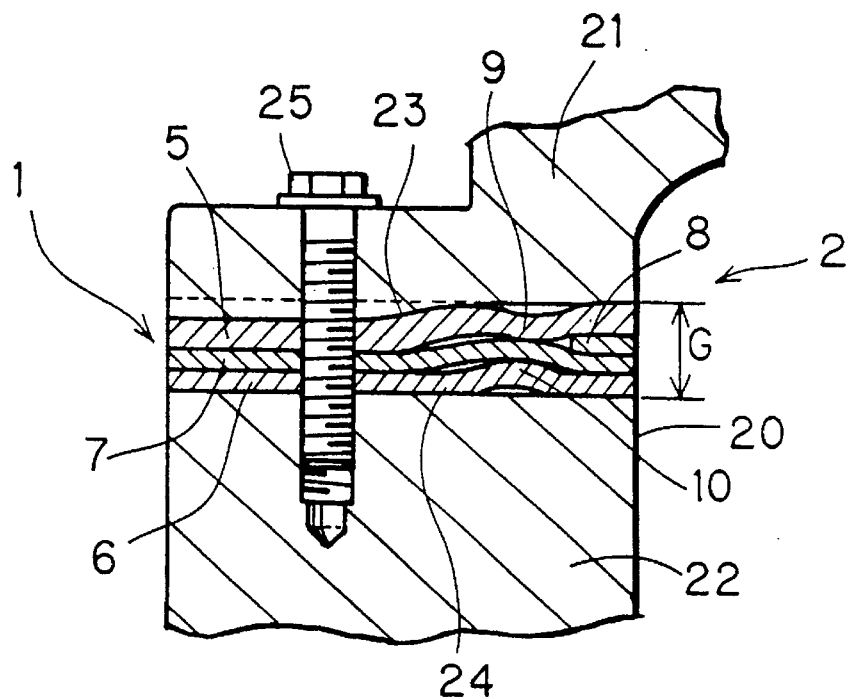
FIG. 3 is a sectional view showing a condition wherein the gasket of the first embodiment is tightened between the joint surfaces of the cylinder head and the cylinder block.

Referring to FIG. 1 to FIG. 3, numeral 1 designates a cylinder head gasket made of the laminated metal gasket of the present invention. The gasket 1 is provided with a combustion chamber hole portion 2, liquid passage hole portions 3, such as water passage hole portions and oil passage hole portions, and bolt hole portions 4 for allowing tightening bolts to pass through. In FIG. 1, only two liquid passage hole portions 3 are shown to simplify the figure.

As showing in FIG. 2, the gasket 1 comprises an intermediate plate 7 made of a metal plate and having a folded portion 8 at the peripheral edge portion adjacent to the combustion chamber hole portion 2 and surface plates 5 and 6 made of elastic metal plates, such as steel or stainless steel plates, laminated on both sides of the intermediate plate 7. On the surface plates 5 and 6, beads 9 and 10 surrounding the combustion chamber hole portion 2 are disposed outside the folded portion 8 of the intermediate plate 7. Furthermore, the beads 9 and 10 of the surface plates 5 and 6 are disposed so that their vertexes come into contact with the intermediate plate 7, facing each other. Numeral 11 designates a thin layer of sealing material made of heat-resistant rubber or plastic, which is coated on the surfaces of the surface plates 5 and 6 and has a micro-sealing function for compensating for the surface roughness, minute scratches, etc. on the intermediate plate 7 and the joint surfaces coming into contact with the surface plates 5 and 6.

The gasket shown in FIG. 2 is interposed between the joint surfaces so that the upper side in the figure comes into contact with the joint surface of the cylinder head, and the lower side in the figure comes into contact with the joint surface of the cylinder block, as explained later referring to FIG. 3. The gasket shown in FIG. 2, is structured on the assumption that larger distortion and deformation are caused on the joint surface on the cylinder head side because of the reasons described above. The folded portion 8 of the intermediate plate 7 is formed by folding back the peripheral edge portion of the combustion chamber hole portion 2 of the intermediate plate 7 upward, that is, on the cylinder head side. Furthermore, the bead 9 disposed on the surface plate 5 coming into contact with the joint surface of the cylinder head is formed sufficiently higher than the bead 10 disposed on the surface plate 6 coming into contact with the joint surface of the cylinder block.

FIG. 3 shows a condition wherein the gasket 1 shown in FIG. 2 is interposed between the joint surface 23 of the cylinder head 21 made of an aluminum alloy and the joint surface 24 of the cylinder block 22 made of cast iron or an aluminum alloy of an engine, and the gasket 1 is secured between the joint surfaces 23 and 24 by tightening a bolt 25 (the sealing layers 11 are not shown to simplify the figure). The joint surface 23 of the cylinder head 21 is distorted and deformed by the tightening force of the bolt 25 from the condition indicated by a dotted line (almost parallel to the joint surface 24 of the cylinder block) before tightening the bolt 25 to the condition indicated by a solid line, and gap G between the cylinder head 21 and the cylinder block 22 is increased at the peripheral edge portion of the combustion chamber 20.

Referring to FIG. 3, the distortion and deformation of the joint surface 23 on the cylinder head side are larger than those on the joint surface 24 on the cylinder block side. However, the distortion and deformation on the joint surface 23 are not always larger but those on the joint surface 24 on the cylinder block side are sometimes larger depending on the structure of the cylinder block 22. In many cases, however, the distortion and deformation of the joint surface 23 on the cylinder head side are made larger due to the bolt tightening force, high temperature and pressure caused by combustion gas. Accordingly, the gasket shown and described in the above first embodiment and the following other embodiments is constructed on the assumption that the joint surface thereof on the cylinder head side shown on the upper side of each figure is distorted larger.

In the gasket 1 of the present invention interposed between the joint surface 23 of the cylinder head 21 and the joint surface 24 of the cylinder block 24, as shown in FIG. 3, the peripheral edge portion of the combustion chamber hole portion 2, which is thicker than other portions because of the existence of the folded portion 8, compensates for the gap G around the combustion chamber 20, which is increased because of distortion and deformation, thereby sealing gas in the combustion chamber 20. In addition, the bead 9 of the surface plate 5 and the bead 10 of the surface plate 6 are compressed to form sealing lines having high surface pressure on the joint surfaces 23, 24. In this way, double sealing is formed. Furthermore, the bead 9 of the surface plate 5 coming into contact with the joint surface 23 of the cylinder head 21, which is distorted and deformed larger, is formed higher than the bead 10 of the surface plate 6 coming into contact with the joint surface 24 of the cylinder block 22. Accordingly, the amount of restoration of the bead 9 is larger than that of the bead 10. The bead 9 can therefore sufficiently follow such large distortion and deformation on the joint surface 23, thereby ensuring necessary seal surface pressure. As a result, no leak is caused.

Moreover, since the folded portion 8 of the intermediate plate 7 is formed by folding the peripheral edge portion of the combustion chamber hole portion 2 of the intermediate plate 7 to the cylinder head side, the folded portion 8 functions to reduce the expansion and shrinkage of the bead 9 due to the gas pressure in the combustion chamber, thereby protecting the bead 9 which is convex-shaped, formed higher than the bead 10 and susceptible to creep relaxation and crack occurrence.

Figure 4:
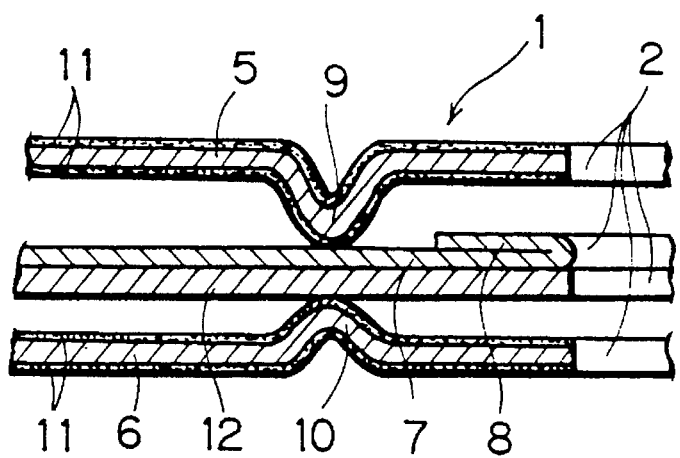
FIG. 4 is a sectional view similar to FIG. 2 but showing a second embodiment.

In the second embodiment shown in FIG. 4, a second intermediate plate 12 made of a metal plate is laminated on the lower side of a intermediate plate 7 having a folded portion 8, that is, on the cylinder block side. The vertex of the bead 10 of the surface plate 6 coming into contact with the joint surface of the cylinder block comes into contact with the lower surface of the second intermediate plate 12. Other than the structures described above, the second embodiment is identical to the first embodiment, including the fact that the bead 9 of the surface plate 5 is formed higher than the bead 10 of the surface plate 6 and the vertex of the bead 9 comes into contact with the intermediate plate 7 having the folded portion 8.

Figure 6A:
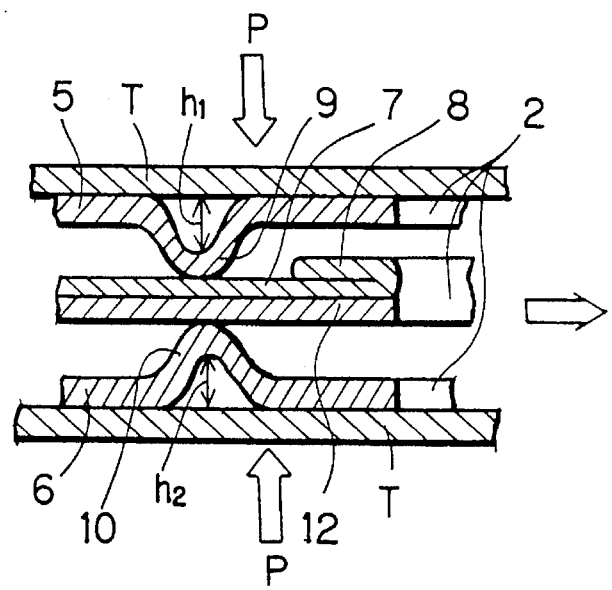
FIGS. 6 (a) and 6 (b) are views illustrating the production of the gasket of the second embodiment by using a precompression method.
Figure 6B:
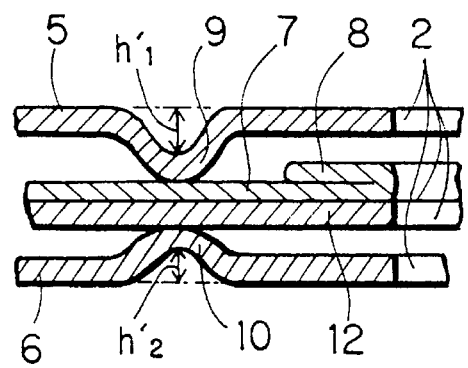

The structure of the second embodiment is advantageous when the laminated metal gasket of the present invention is produced as follows: the surface plates 5 and 6 are formed so that the bead 9 (height $h_1$ in FIG. 6) of the surface plate 5 and the bead 10 (height $h_2$) of the surface plate 6 are equal in height ($h_1=h_2$), and the surface plates 5 and 6 are assembled in the laminated metal gasket. The assembly is then precompressed, for example, between flat-shaped molds T by applying compression force P as shown in FIG. 6 (a) so that the height $h_1'$ of the bead 9 is made larger than the height $h_2'$ of the bead 10 after precompression as shown in FIG. 6 (b).

Figure 7:
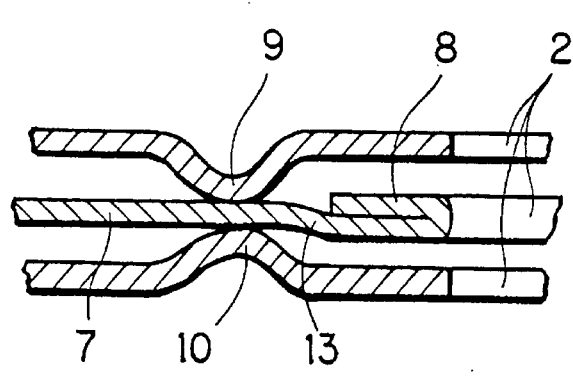
FIG. 7 is a view illustrating a problem encountered when the gasket of the present invention is produced by precompression.

The intermediate plate 7 is relatively thin so that the folded portion 8 can be formed. When there is no second intermediate plate 12, a bent 13 is apt to generate outside the folded portion 8 of the intermediate plate 7 as shown in FIG. 7 by taking the production method described above. As a result, the difference between the height $h_1'$ of the bead 9 and the height $h_2'$ of the bead 10 becomes small and the degree of the bent is apt to vary irregularly, thereby causing more variation in the value of $h_1'-h_2'$. When the second intermediate plate 12 is present, particularly when the plate is thick considerably, the resistance against the above-mentioned bending becomes larger, and the desired values of $h_1'$ and $h_2'$ can be obtained. Accordingly, it is desired that the thickness of the second intermediate plate 12 is larger than that of the intermediate plate 7, more particularly, a relatively large value of 0.3 to 0.5 mm.

Figure 5:
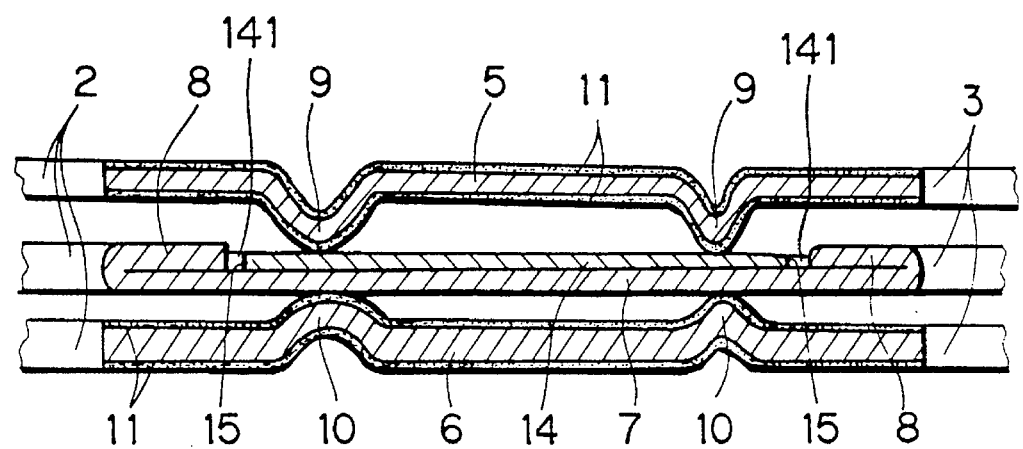
FIG. 5 is a sectional view similar to the sectional view taken on line B—B of FIG. 1 but showing a third embodiment.

In the sealing structure around the combustion chamber hole portion 2 of a third embodiment shown in FIG. 5, a thickness regulating plate 14, which is thinner than an intermediate plate 7 and provided with a hole portion 141 having a large inner diameter and surrounding a folded portion 8 without overlapping the folded portion 8, is laminated on the intermediate plate 7 on the side of the folded portion 8 thereof, that is, on the intermediate plate 7 on the surface plate 5 side coming into contact with the joint surface of the cylinder head. The inner peripheral edge portion 15 of the hole portion 141 of the thickness regulating plate 14 is positioned outside the folded portion 8 and positioned inside the bead 9 so that the vertex of the bead 9 of the surface plate 5 comes into contact with the thickness regulating plate 14. By appropriately selecting the thickness of the thickness regulating plate 14, the difference between the thickness of the gasket at the folded portion 8 adjacent to the combustion chamber hole portion 2 and the thickness of the gasket at the portion outside the folded portion can be adjusted finely. Other than the structures described above, the sealing structure around the combustion chamber hole portion 2 in the third embodiment is identical to that of the first embodiment.

Since FIG. 5 is a sectional view which corresponds to a sectional view taken on line B—B in FIG. 1, FIG. 5 also shows a sealing structure provided around the liquid passage hole portion 3. Since the sealing structure provided around the liquid passage hole portion 3 is completely identical to the sealing structure provided around the combustion chamber hole portion 2, the sealing structure is not detailed here. The same reference numerals designate the same or corresponding parts.

Figure 8:
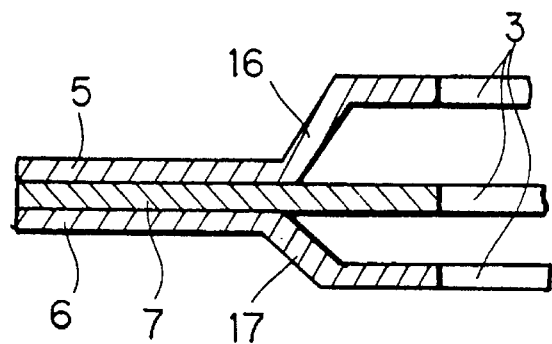
FIG. 8 is a sectional view showing a gasket provided with sloped steps around a liquid passage hole.
Figure 9:
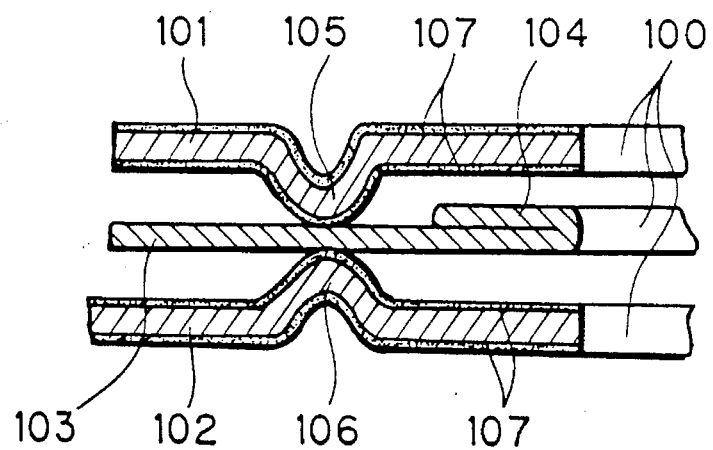
FIG. 9 is a sectional view showing a sealing structure of a conventional gasket.

However, since high sealing pressure is not required around the liquid passage hole portion 3, unlike around the combustion chamber hole portion 2, the above-mentioned sealing structure of the present invention is not always required around the liquid passage hole portion 3. Accordingly, a sealing structure which can follow the condition of the joint surface subjected to large distortion and deformation and can apply high sealing pressure may be satisfactory. For example, as shown in FIG. 8, a structure wherein sloped steps 16 and 17 are disposed around the liquid passage hole portions 3 of the surface plates 5 and 6, and the sloped step 17 of the surface plate 5 is made higher than the sloped step 17 of the surface plate 6 may be used.

The laminated metal gasket of the present invention described above can be changed and modified as described below. The surface plates 5 and 6 can be disposed so that the beads 9 and 10 project in the direction opposite to the intermediate plate 7. The surface plates 5 and 6 may also be disposed so that the vertexes of the beads 9 and 10 project in the same direction, that is, toward the cylinder head, for example. Furthermore, the layer 11 of the sealing material may be coated on only the outer surfaces of the surface plates 5 and 6, or on the outer surfaces of the surface plates 5 and 6 and the surfaces of the intermediate plate. Moreover, another intermediate plate may be added, or sub-surface plates may be laminated on the outer surface of the surface plates. Still more, in the sealing structure shown in FIG. 8, a folded portion may be provided on the intermediate plate 7 by folding back the inner peripheral edge portion around the liquid passage hole portion 3. Additionally, the laminated metal gasket of the present invention and the method of producing the same may be changed and modified variously without departing from the spirit and scope of the present invention.

We claim:

1. A laminated metal gasket disposed between a pair of joint surfaces having at least one hole to be sealed comprising:

at least one intermediate plate made of a metal plate, and a pair of surface plates made of elastic metal plates laminated on both sides of said intermediate plate, said intermediate plate and said surface plates each having at least one hole portion corresponding to said hole to be sealed, said intermediate plate being equipped, adjacent to said hole portion, with an annular folded portion which is made by folding back the inner peripheral edge portion thereof to said surface plate coming into contact with the joint surface to be subjected to more significant distortion and deformation during operation among the pair of joint surfaces, and said surface plates each being equipped with a bead surrounding said hole portion outside said folded portion, wherein said bead of said surface plate coming into contact with the joint surface to be subjected to more significant distortion and deformation is made higher than the bead of said surface plate coming into contact with the other joint surface.

2. A laminated metal gasket according to claim 1, wherein a flat second intermediate plate which is made of a metal plate and does not have any folded portion or bead is disposed between the surface of said intermediate plate opposite to the side on which said folded portion is disposed and the surface plate coming into contact with the other joint surface.

3. A laminated metal gasket according to claim 2, wherein the thickness of said second intermediate plate is larger than that of said intermediate plate equipped with said folded portion.

4. A laminated metal gasket according to claim 1, wherein a thickness regulating plate, which is thinner than said intermediate plate equipped with said folded portion, and provided with a hole portion having a large inner diameter and surrounding said folded portion without overlapping said folded portion, is laminated on the surface of said intermediate plate on the side of said folded portion.

5. A laminated metal gasket according to claim 1 wherein the vertexes of said beads on said pair of surface plates face each other so that the vertexes come into contact with said intermediate plate.

6. A laminated metal gasket according to claim 1, 2 or 4, wherein a thin layer made of sealing material, chosen from the group consisting of rubber and plastic is coated on the surfaces of said surface plates.

7. A laminated metal gasket according to claim 1, wherein said pair of joint surfaces are joint surfaces of the cylinder head and the cylinder block of an internal combustion engine, and one of said joint surfaces, which is distorted and deformed more significantly during operation, is the joint surface of the cylinder head.

8. A laminated metal gasket according to claim 7, wherein the cylinder head is made of an aluminum alloy and the cylinder block is made of cast iron.

9. A laminated metal gasket according to claim 7, wherein the cylinder head and the cylinder block are made of an aluminum alloy.

10. A laminated metal gasket according to claim 1, wherein a hole to be sealed is a combustion chamber hole.

11. A laminated metal gasket according to claim 1, wherein a hole to be sealed is a liquid passage hole.

12. A laminated metal gasket disposed between the joint surfaces of the cylinder head and the cylinder block of an internal combustion engine, said gasket comprising:

at least one intermediate plate made of a metal plate, and a pair of surface plates made of elastic metal plates laminated on both sides of said intermediate plates, said intermediate plate and said surface plates each having at least one combustion chamber hole portion, said intermediate plate being equipped, adjacent to said combustion chamber hole portion, with a folded portion which is made by folding back the inner peripheral edge portion around said combustion chamber hole portion to said surface plate coming into contact with the cylinder head, said surface plates each being equipped with a bead surrounding said combustion chamber hole portion outside said folded portion, wherein said bead of said surface plate coming into contact with the cylinder head is made higher than said bead of said surface plate coming into contact with the cylinder block.

13. A laminated metal gasket according to claim 12, wherein said intermediate plate and said surface plates are further provided with at least one liquid passage hole portion, and said surface plates are each provided a sloped step surrounding said liquid passage hole portion, wherein said sloped step of said surface plate coming into contact with the cylinder head is made higher than said sloped step of said surface plate coming into contact with the cylinder block.

* * * * *